United States Patent [19]
Green et al.

[11] Patent Number: 5,433,472
[45] Date of Patent: Jul. 18, 1995

[54] QUICK-LOCKING DEVICE FOR RETENTION OF AN INFLATOR IN A PASSENGER-SIDE CANISTER

[75] Inventors: David J. Green; Donald J. Paxton, both of Brigham City, Utah

[73] Assignee: Morton International, Inc., Chicago, Ill.

[21] Appl. No.: 220,802

[22] Filed: Mar. 31, 1994

[51] Int. Cl.⁶ ............................................. B60R 21/16
[52] U.S. Cl. ................................. 280/728.2; 280/732
[58] Field of Search ............... 280/728 A, 728 R, 732

[56] References Cited

U.S. PATENT DOCUMENTS

| | | | |
|---|---|---|---|
| 3,514,125 | 5/1970 | Nemecek | 280/728 A |
| 4,964,654 | 10/1990 | Bishop et al. | 280/728 A |
| 5,058,919 | 10/1991 | Paquette et al. | 280/732 |
| 5,096,222 | 3/1992 | Komerska et al. | 280/732 |
| 5,127,669 | 7/1992 | Suran et al. | 280/732 |
| 5,135,252 | 8/1992 | Suran et al. | 280/732 |
| 5,145,207 | 9/1992 | Bederka et al. | 280/732 |
| 5,234,227 | 8/1993 | Webber | 280/728 |

*Primary Examiner*—Margaret A. Focarino
*Assistant Examiner*—Christopher Ellis
*Attorney, Agent, or Firm*—Mark F. LaMarre; Robert M. Didrick; Gerald K. White

[57] ABSTRACT

A device for securing a passenger-side inflator to a module housing without the use of fasteners or special tools is disclosed. An elastically flexible tab formed into one wall of the canister and placed at an angle of about 3° to about 45° engages with a boss or recessed section at one end of the inflator. A raised section may be formed in the base of the inflator, which raised section engages with the outer wall of the inflator causing it to further engage with the canister.

9 Claims, 7 Drawing Sheets

QUICK-LOCKING DEVICE FOR RETENTION OF AN INFLATOR IN A PASSENGER-SIDE CANISTER

BACKGROUND OF THE INVENTION

1. Field of the Invention

This invention relates generally to inflatable-type modular occupant restraint systems for passenger vehicles or, as they are more commonly known, air bag restraint systems. More particularly, this invention relates to an improved means for quickly securing a passenger-side inflator in an air bag canister.

2. Description of Related Art

An air bag restraint system typically includes a canister, which has an open side and which canister encloses an inflator and at least part of an air bag, and a cover which conceals the module from view. A driver side air bag module is typically mounted in the center of the steering wheel behind a protective cover. When the air bag module is designed for the passenger side of a vehicle, the container may be located just behind the vehicle dashboard, cosmetic cover, or passenger side instrument panel (hereinafter referred to as "dashboard") and the cover may form an integral part of the vehicle dashboard.

When the vehicle is involved in a collision, a crash signal initiates operation of the inflator to cause the air bag to deploy. The inflator provides an inert gas (e.g., nitrogen) which is directed under pressure into the air bag to force the air bag out of the canister incorporated in the module and into the passenger compartment of the vehicle. As the air bag is forced out of the module, the pressure exerted on the driver-side protective cover or dashboard causes selected portions of the cosmetic cover to separate, in a predetermined manner, along tear seams or breakaway seams (hereinafter referred to as "tear seams") to enable the air bag to be directed into the passenger compartment.

In the conventional mounting of a passenger-side air bag inflator in a canister, as shown generally at 10 in FIG. 1, an inflator 12 having a first end 14 is inserted through opening 16 in the canister first wall 18. A mounting stud 20 attached to the first end 14 is inserted through a first aperture 22 in the canister second wall 24 and the inflator is secured with nut 26. A flange 28 on the inflator second end 30 engages with the opening 16.

As inflator designs improve, one modification is to remove the flange 28 on the inflator second end 30 to produce an inflator having a constant diameter. The aforementioned installation procedure and components must be modified to provide for the use of the improved inflator designs. Further, the aforementioned installation process requires a number of fastening steps and machine steps to secure the inflator, which installation steps increase the cycle time for the manufacture of a module. Further, the use of fasteners to attach the inflator to an air bag module is a major cause of reworking of the inflator module assembly due to the necessity of replacing broken or unsecured fasteners. Reworking of the inflator module is not always possible. In these situations the defective modules must be discarded, resulting in lost production and increased manufacturing costs. The elimination of fasteners in the manufacture of the air bag module assembly would eliminate a major cause for reworking and disposal of defective inflator modules. Further, a simplified attachment system which would permit easy removal of the inflator without the need for special tools would reduce the cost and time associated with reworking of the module should removal become necessary.

Paquette et al., U.S. Pat. No. 5,058,919, recites the use of an air bag/cover subassembly and an inflator/reaction device subassembly which combine to form an air bag module. The inflator/reaction device utilizes an end wall with a generally circular shape and a circular opening connected to the perimeter of the side wall by a slot. The opposite endwall is generally perpendicular to the side walls of the canister and has an opening to accommodate an inflator shaft and a resilient tab that deflects to permit the installation of the inflator then snapping back in place capturing the inflator shaft in the opening.

Webber, U.S. Pat. No. 5,234,227, recites an air bag assembly designed for installation in a variety of differently-configured passenger vehicle instrument panels. The canister of the Webber air bag assembly has two oppositely facing end walls. One of the end walls contains an engaging tab that is deflected by a lug attached to the end of the inflator when the inflator is installed in the canister. The engaging tab bites into the surface of the lug securing the inflator against removal.

The recitations of cited related art do not provide for positive engagement of the inflator to prevent the inflator from rattling within the canister due to vibrations caused by the operation of the vehicle. Further, the cited related art does not provide for easy removal of the inflator from the canister after the inflator has been installed.

SUMMARY OF THE INVENTION

An objective of this invention is to overcome one or more of the problems noted with the related art. These and other objectives of the invention, which will become apparent from the following description, have been achieved by a novel device for securing an air bag inflator having a substantially circular cross section to an air bag module canister. The inflator for use with this invention has a tubular outside wall, a first end having a stud attached thereto, and a second end having an attachment means, such as a boss or a concave depression, affixed thereto. An end wall of the canister has a panel with a elastically flexible portion which is inclined toward the opposite end wall at an angle from about 3° to about 45° and which engages with the attachment means of the inflator to secure the inflator into position. When the inflator is inserted into the canister, the stud passes through an aperture in one wall of the canister and the elastically flexible portion of said second end wall bends outwardly to accommodate for the installation of the inflator and returns substantially to its original position, thereby engaging with the attachment means and pushing the inflator toward the opposite end wall.

To provide improved engagement between the inflator and the canister, a raised section may be formed in the base of the canister such that when the inflator is installed the raised section engages with the outside wall of the inflator and pushes it upward causing the inflator to engage positively with the canister end wall and the elastically flexible portion of the second end wall. The raised section may be in the form of at least one ridge perpendicular or parallel to the longitudinal axis of the canister. Also, the raised section may be in the form of one or more dimples formed into the base of the canister.

BRIEF DESCRIPTION OF THE DRAWINGS

With this description of the invention, a detailed description follows with reference being made to the accompanying figures of drawings which form part of the specification related thereto, in which like parts are designated by the same reference numbers, and of which.

DETAILED DESCRIPTION OF THE INVENTION

Figure 1:
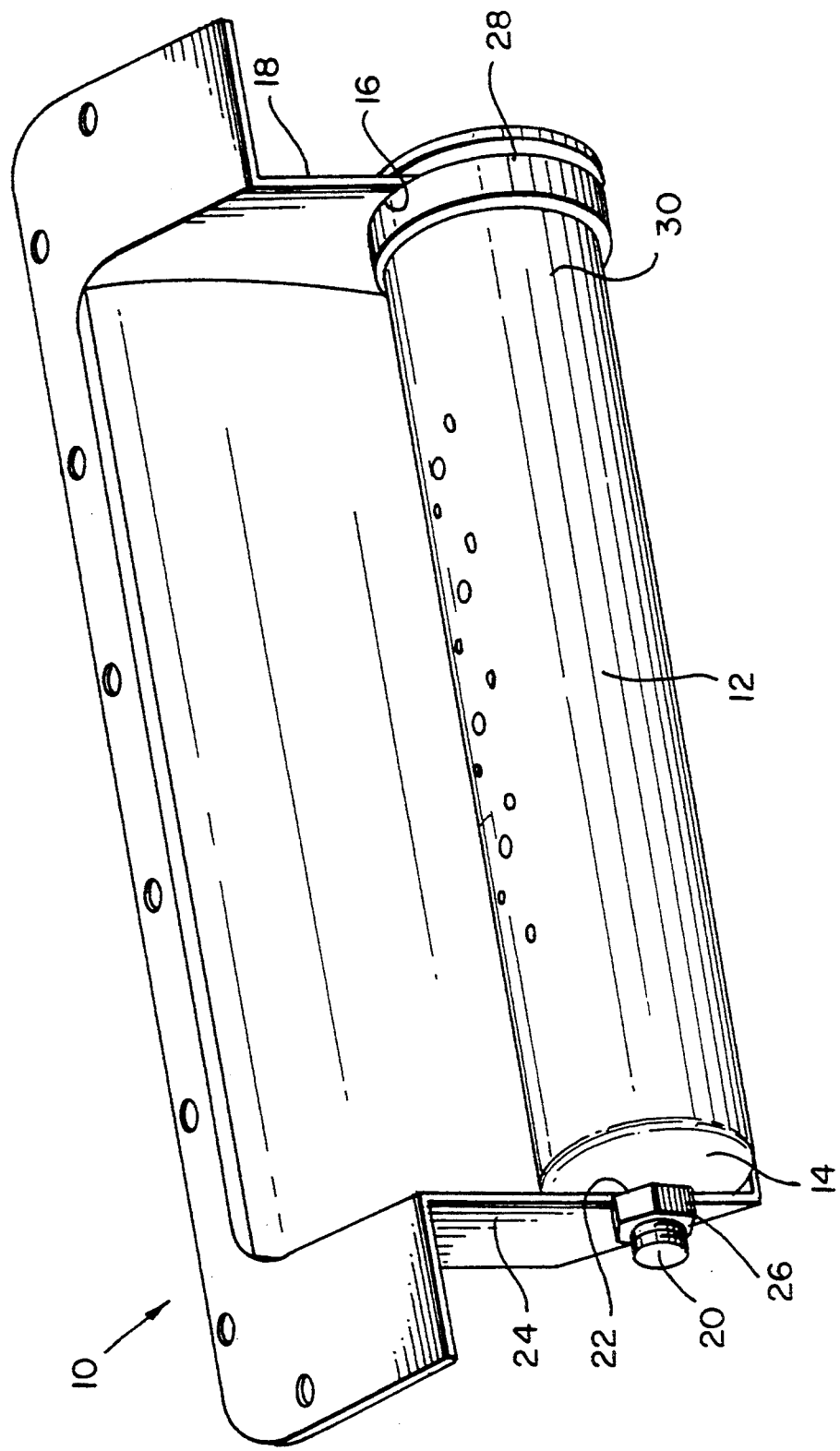
FIG. 1 is a fragmented three-dimensional view illustrating a prior art passenger-side module assembly.
Figure 2:
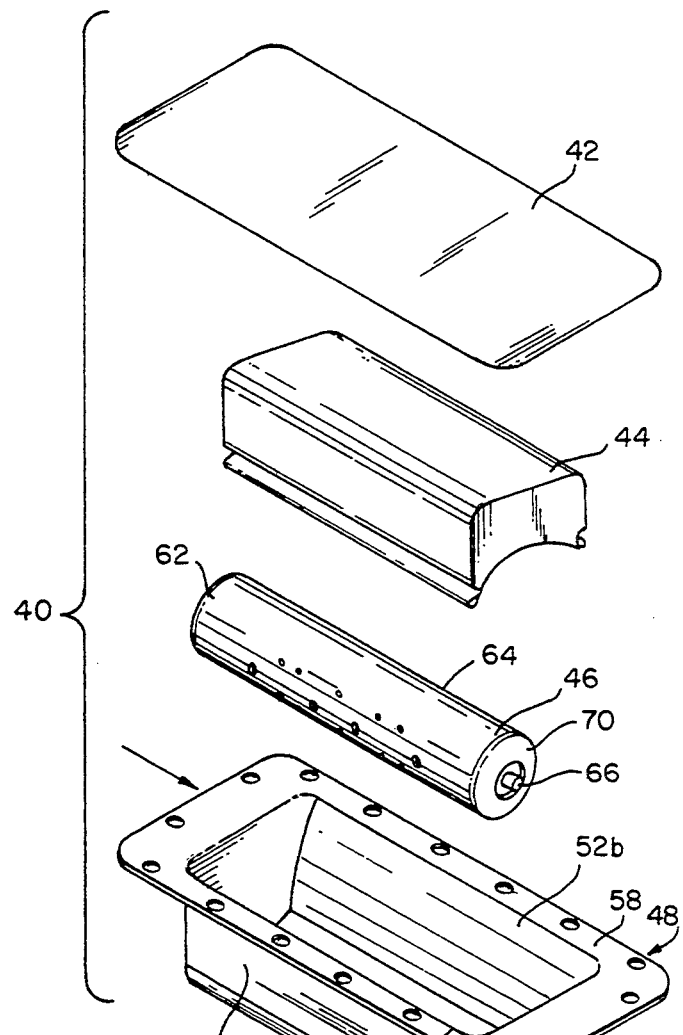
FIG. 2 is an exploded three-dimensional view of the elements forming the air bag module assembly.
Figure 3A:
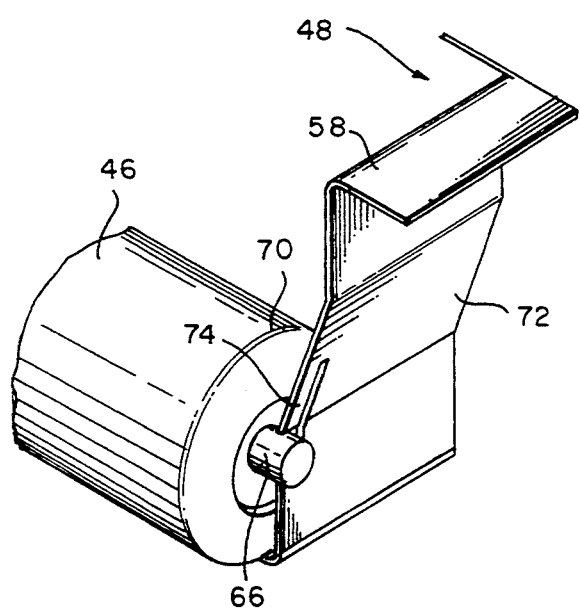
FIG. 3a is a fragmented three-dimensional view illustrating the engagement of the elastically flexible tab with the inflator boss.
Figure 3:
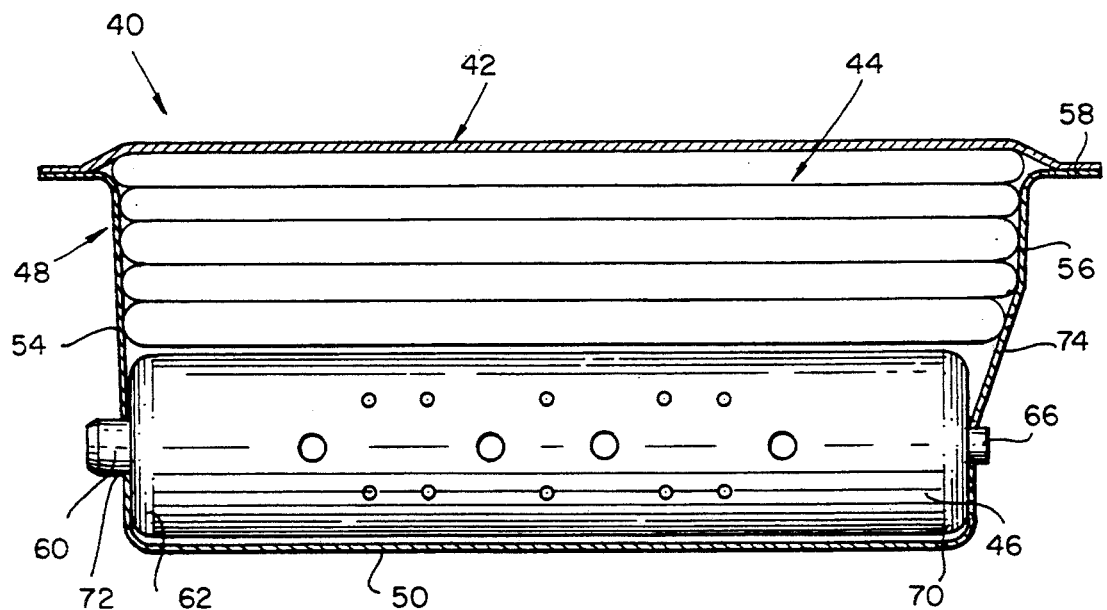
FIG. 3 is a cross-sectional view of the air bag assembly of the present invention.

Referring to FIG. 1, a passenger-side inflator module is shown generally at 40 in three-dimensional exploded view. FIGS. 2 and 3 show, in side views, two different embodiments of this invention. The passenger-side module 40 comprises a module cover 42, an air bag cushion 44, an inflator 46, and a canister 48. A sensor (not shown) is attached to the inflator 46 with initiator cables (not shown). The canister 48 comprises a base 50 attached to two side walls 52a and 52b, a first end wall 54, and a second end wall 56, which walls are attached to a mounting flange 58.

Figure 10:
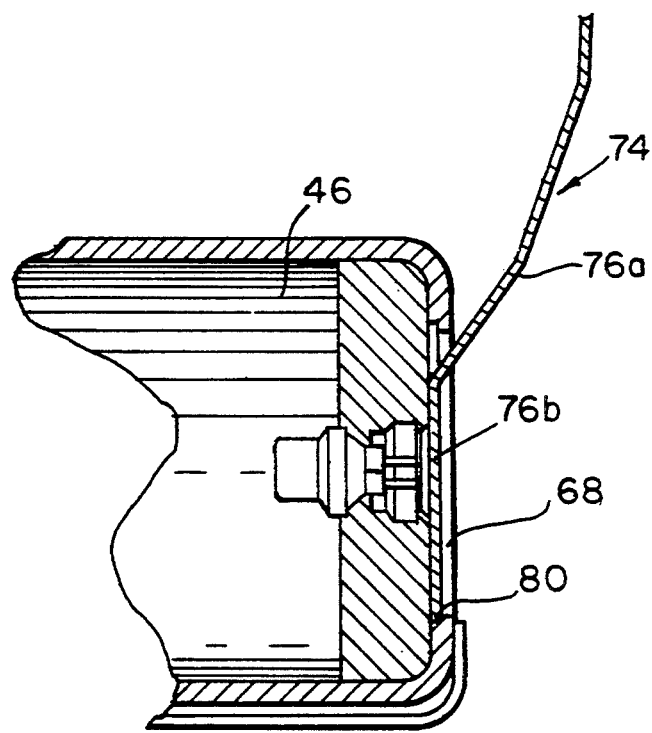
FIG. 10 is a detailed cross-sectional view of the inflator illustrating a groove in the concave depression of an inflator.
Figure 11:
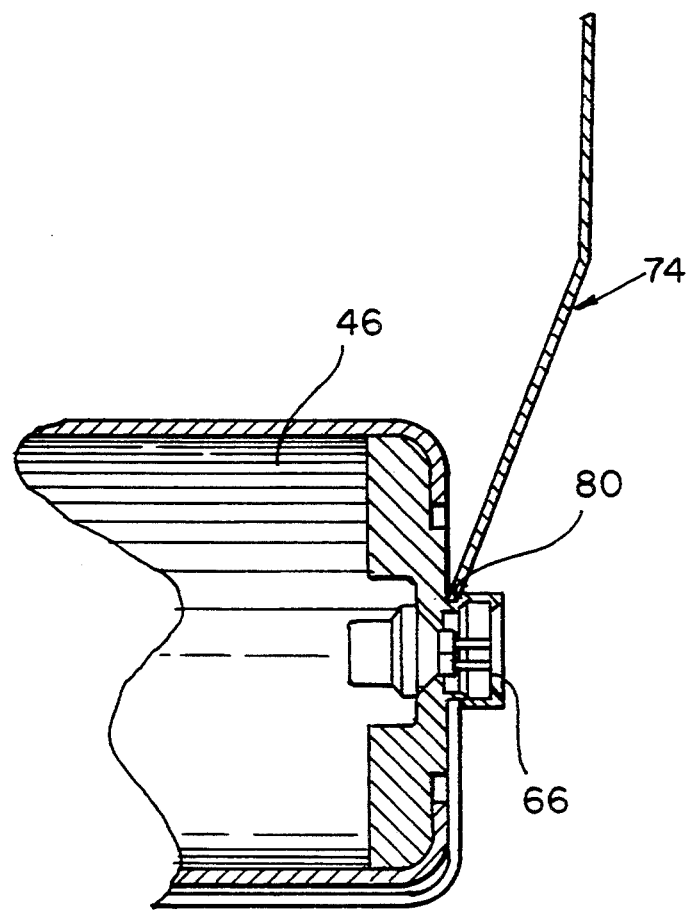
FIG. 11 is a detailed cross-sectional view of the inflator illustrating a groove in the boss of an inflator.

An inflator 46 having a mounting stud 60 attached to the inflator first end 62, an outside wall 64, and a boss 66 or recessed section 68 (as shown in FIGS. 5a to 5c and FIG. 10) affixed to the inflator second end 70 is secured in the canister 48. The mounting stud 60 passes through a first aperture 72 in the first end wall 54 and the boss 66 or recessed section 68 is secured by an elastically flexible tab 74 formed as part of the canister second end wall 56, as shown in FIG. 3a. The mounting stud 60 may be rectangular in cross section or some other shape and be "keyed" to the first aperture 72 to provide for the proper orientation of the installed inflator 46. The elastically flexible tab 74 is inclined from the perpendicular toward the first end wall 54 at an angle of from about 3° to about 45°, more preferably from about 5° to about 45°, and more preferably from about 7.5° to about 35°. The elastically flexible tab 74 may be shaped such that a first angled section 76a and a second section 76b perpendicular to the canister opening 78 are formed. A groove or channel 80 may be cut into the boss 66 or recessed section 68, as shown in FIGS. 10 and 11, in order to provide improved engagement between the elastically flexible tab 74 and the boss 66 or recessed section 68.

It is believed that the inclination of the elastically flexible tab 74 preforms two primary functions: first, when the inflator 46 is installed the inclined elastically flexible tab 74 pushes the inflator 46 toward the first end wall 54; and second when the inflator 46 is installed the elastically flexible tab 74 provides improved ease of installation of the inflator 46 by being able to accommodate the full length of the inflator 46, as is shown in FIGS. 5a, 5b, 5c, and FIGS. 6a, 6b, and 6c.

Figure 4:
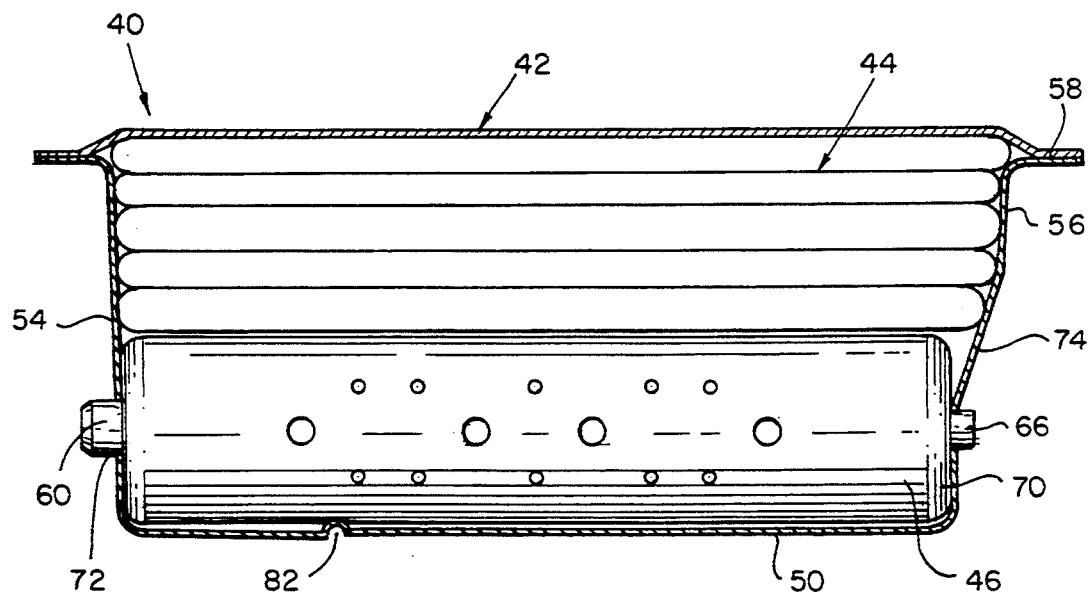
FIG. 4 is a cross-sectional view of the air bag assembly of the present invention with a raised section in the canister base in engagement with the air bag inflator.
Figure 5A:
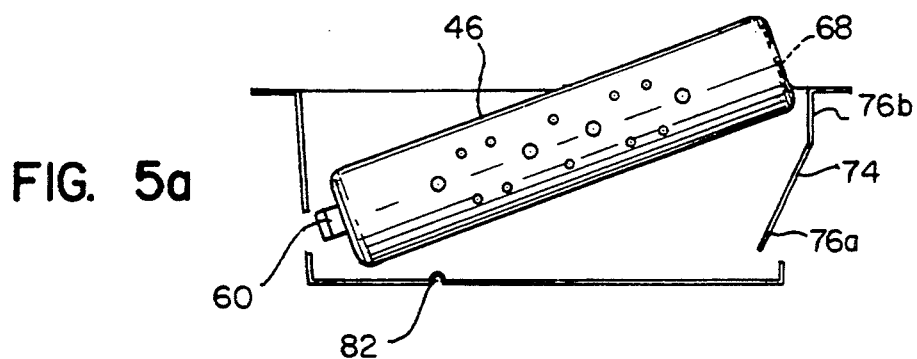
FIGS. 5a, 5b, and 5c are partial side views illustrating the installation of an inflator having a recessed section into the canister of this invention.
Figure 5B:
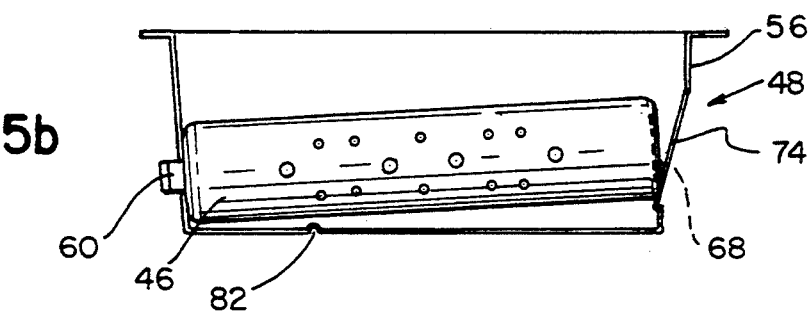
Figure 5C:
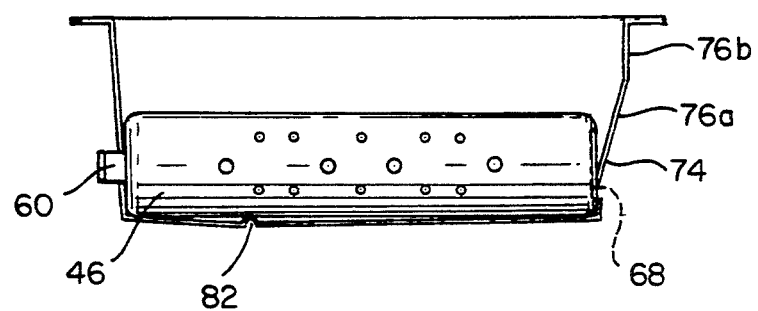
Figure 5D:
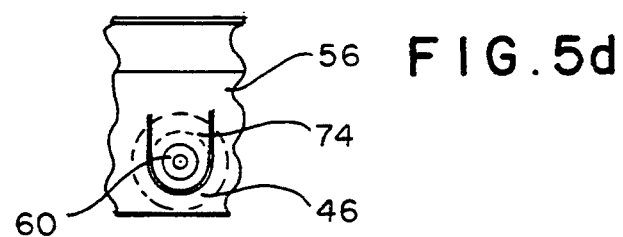
FIG. 5d is an end view illustrating the elastically flexible portion of the canister engaged with the recessed section at the end of the inflator.
Figure 6A:
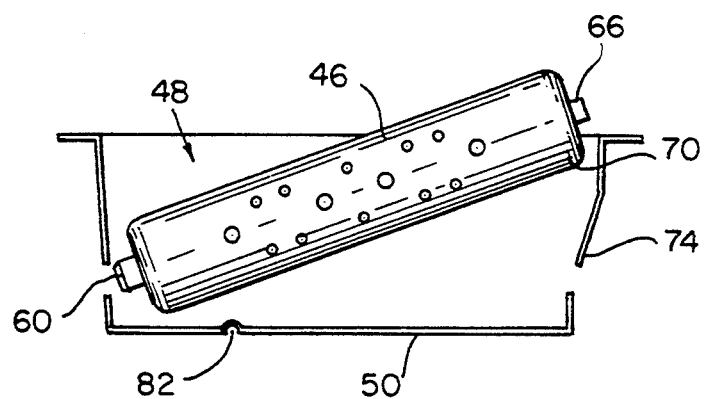
FIGS. 6a, 6b, and 6c are partial side views illustrating the installation of an inflator having a boss into the canister of this invention.
Figure 6B:
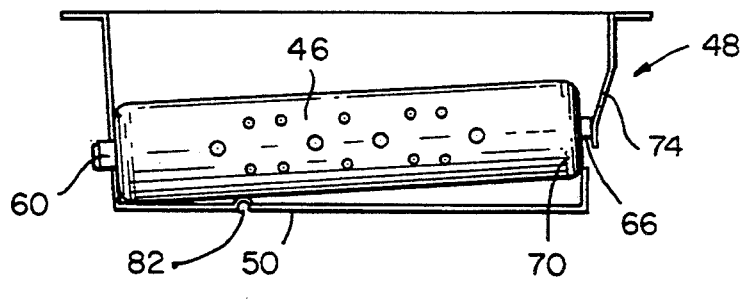
Figure 6C:
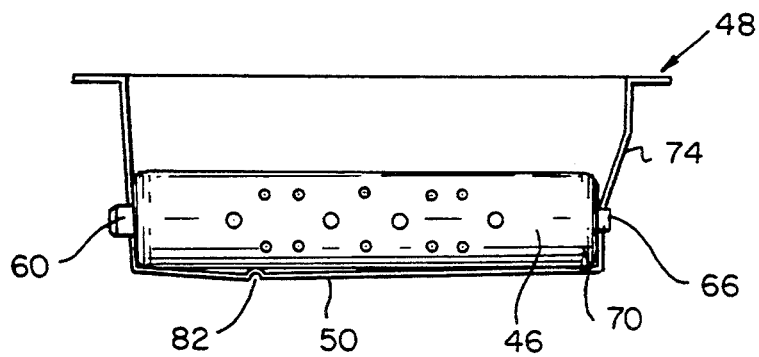
Figure 6D:
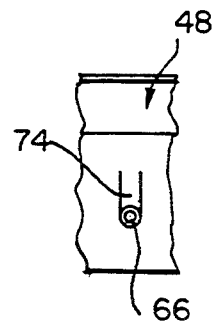
FIG. 6d is an end view illustrating the elastically flexible portion of the canister engaged with a boss attached to the end of the inflator.
Figures 7A, 7B:
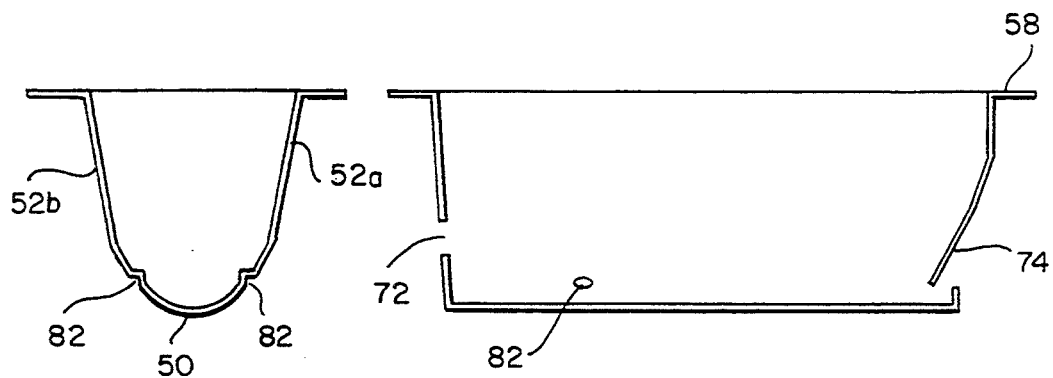
FIGS. 7a and 7b are an end view and a side view of the canister of this invention illustrating dimples as the raised section of the canister base.
Figures 8A, 8B:
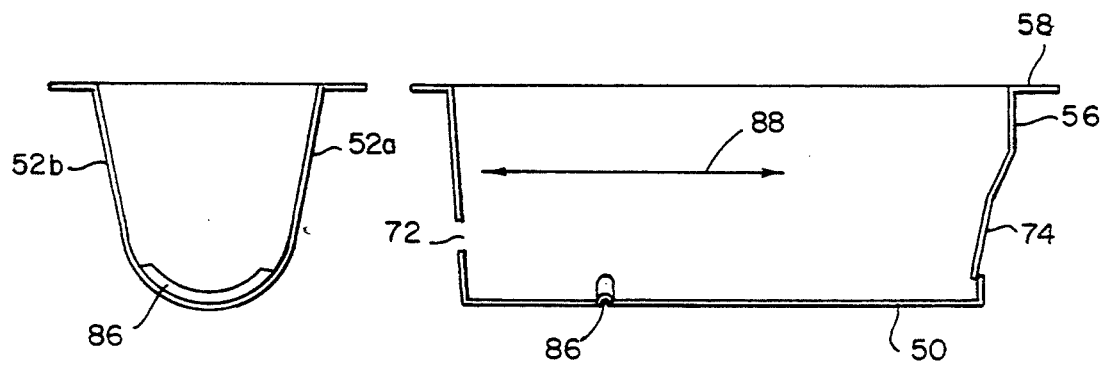
FIGS. 8a and 8b are an end view and a side view of the canister of this invention illustrating a ridge perpendicular to the axis of the canister as the raised section of the canister base.
Figures 9A, 9B:
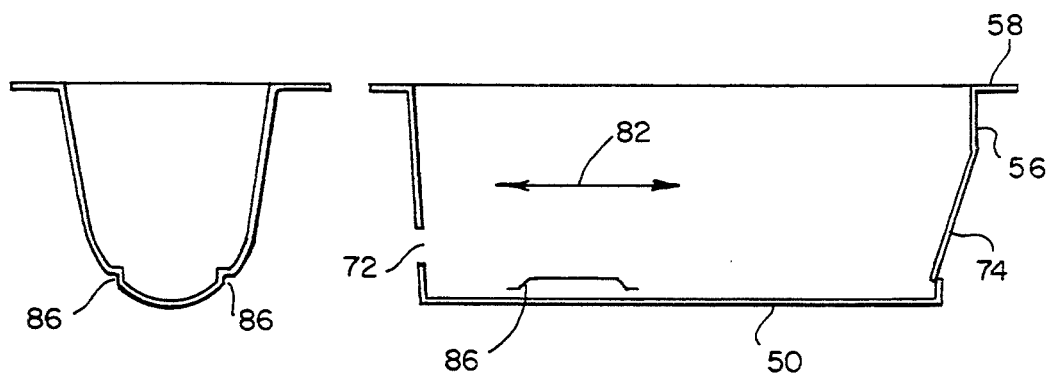
FIGS. 9a and 9b are an end view and a side view of the canister of this invention illustrating ridges parallel to the axis of the canister as the raised section of the canister base.

In the second embodiment of this invention, as shown in FIG. 4, a raised section 82 is formed in the base 50 of the canister 48 and is directed inwardly thereof. When the inflator 46 is installed the raised section 82 engages with the outside wall 64 of the inflator 46. The raised section 82 working in combination with the first aperture 72, the elastically flexible tab 74, and the inflator outside wall 64 positively engages the inflator 46 in the canister 48, thereby significantly reducing the rattle of the inflator due to vehicular vibration. The raised section 82 can be in the form of a dimple 82, as shown in FIGS. 7a and 7b, a ridge 86 perpendicular to the longitudinal axis 88 of the canister 48, as shown in FIGS. 8a and 8b, or at least one ridge 86 parallel to the longitudinal axis 88 of the canister 48. The raised section 82 may be of such a height that when the inflator 46 is installed the base 50 of the canister 48 bends or flexes in a downward direction. The normal reaction of the base 50 is to return to the pre-installation condition. With the inflator 46 installed the raised section 82 acts as a fulcrum with the inflator 46 as a lever. The first aperture 72 and the elastically flexible tab 74 push downward on the inflator 46, thereby positively engaging the inflator 46 and reducing rattle due to vehicular vibration. The raised section 82 may be placed anywhere along the base 50; however, it is preferable to place it between one-quarter and one-half of the distance from the first end wall 54 to the second end wall 56.

The inflator 46 for use with this invention can be of pyrotechnic, hybrid or stored gas types, as known in the art, and modified as described herein. The inflator 46 may be constructed from steel, stainless steel, or preferably aluminum. The canister 48 for use with the invention can be of convention design, modified as described herein to meet with the requirements of the invention.

To assemble an air bag module 40 as described herein, the inflator 46 of this invention is inserted in a canister 48 such that the stud 60 passes through a first aperture 72 in the first end wall 54 and the boss 66 or recessed section 68 is secured by an elastically flexible tab 74 formed as part of the canister second end wall 56. A raised section 82 as described hereinabove may be used to improve the engagement between the inflator 46 and the canister 48. An air bag cushion 44 and cover 42, as known in the art, are installed. Appropriate electrical hook-ups are made and the module 40 is installed in a motor vehicle. Should removal of the inflator be necessary, the cover 42 and air bag 44 can be removed. The inflator 46 can be removed by pressing outwardly on the elastically flexible tab 74 and pulling up on the inflator. It should be noted that, when the elastically flexible tab 74 is not moved from its normal position as heretofore described, any force applied to the inflator 46 to push it upward will result in the inflator 46 being pushed against the first end wall 54 of the canister 48, thereby further securing the inflator 46. This is advantageous during deployment of the air bag should the orientation of the inflator 46 be such that exhaust gases push the inflator 46 outwardly of the canister 48. The aforementioned procedure will further secure the inflator 46 in the canister 48.

Thus, in accordance with the invention, there has been provided a device which permits the quick installation of an air bag inflator into a canister without the use of fasteners and special tools. There has also been provided a device which permits the quick removal of an inflator without the need for tools.

While the above description constitutes the preferred embodiment of the present invention, it will be appreciated that the invention is susceptible to modification and variation without departing from the proper scope and fair meaning of the accompanying claims.

We claim:

1. An air bag module comprising:
    an elongated cylindrical inflator having a substantially constant cross section, said inflator having a tubular outside wall, a first end having a stud attached thereto, and a second end having a recessed section formed therein, said recessed section having a groove which positively engages with an elastically flexible portion to prevent it from sliding out of the recess; and
    said air bag canister having an inside and an outside surface including a pair of facing side walls, a first end wall having an aperture therein, said first end wall substantially perpendicular and attached to said side walls, a second end wall, and a base attached to said side walls, said first end walls and said second wall thereby defining an air bag canister opening and a cavity for an elongated cylindrical inflator and at least part of a folded automotive air bag cushion, said second end wall comprising a panel with the elastically flexible portion, said elastically flexible portion comprising a section which inclines toward said first end wall at an angle from about 3° to about 45°;
    wherein said inflator is inserted into said canister such that said stud passes through said aperture in said first end and said elastically flexible portion of said second end wall bends to accommodate the installation of said inflator wherein said elastically flexible portion returns substantially to its position prior to installation of said inflator, thereby engaging said attachment means and pushing said inflator toward said first end wall.

2. The module of claim 1 wherein the base of said canister has at least one raised section directed inward of the cavity and which engages with the outside wall of the inflator thereby pushing the inflator outward from the canister and causing the inflator stud to engage with the first wall and the recessed section of the inflator to engage with the second wall of the canister.

3. The device of claim 1 wherein said elastically flexible portion comprises a first section inclined toward said first end wall at an angle from about 3° to about 45° and a second section substantially perpendicular to said air bag canister opening.

4. The device of claim 3 wherein said second section of said elastically flexible section portion is inclined from about 5° to about 45°.

5. The device of claim 4 wherein said second section of said elastically flexible section portion is inclined from about 7.5° to about 35°.

6. The device of claim 2 wherein said raised section is a ridge formed in the base perpendicular to the longitudinal axis of the canister.

7. The device of claim 2 wherein said raised section is at least one ridge formed into the base substantially parallel to the longitudinal axis of said canister.

8. The device of claim 2 wherein said raised section is at least one dimple formed into said base.

9. The device of claim 1 wherein said raised section is positioned in said base from about one-quarter to about one-half the distance between said first end wall and said second end wall.

* * * * *

UNITED STATES PATENT AND TRADEMARK OFFICE
CERTIFICATE OF CORRECTION

PATENT NO. : 5,433,472
DATED : July 18, 1995
INVENTOR(S) : Green et al.

It is certified that error appears in the above-indentified patent and that said Letters Patent is hereby corrected as shown below:

Col. 6, Ln. 44     change "claim 1" to read -- claim 2 --.

Signed and Sealed this

Twenty-third Day of July, 1996

Attest:

BRUCE LEHMAN

Attesting Officer     Commissioner of Patents and Trademarks